(12) United States Patent
Yasuda

(10) Patent No.: US 10,901,124 B1
(45) Date of Patent: Jan. 26, 2021

(54) WAVELENGTH-SELECTIVE ABSORPTIVE MATERIAL, INFRARED SENSOR, WAVELENGTH-SELECTIVE LIGHT SOURCE, AND RADIATION COOLING SYSTEM

(71) Applicant: FUJIFILM CORPORATION, Tokyo (JP)

(72) Inventor: Hideki Yasuda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/030,411

(22) Filed: Sep. 24, 2020

Related U.S. Application Data

(63) Continuation of application No. PCT/JP2019/013285, filed on Mar. 27, 2019.

(30) Foreign Application Priority Data

Mar. 29, 2018 (JP) .................................. 2018-065524

(51) Int. Cl.
*G02B 5/22* (2006.01)
*G02B 5/20* (2006.01)
(Continued)

(52) U.S. Cl.
CPC .............. *G02B 5/208* (2013.01); *B32B 7/023* (2019.01); *F28F 13/18* (2013.01); *G02B 5/26* (2013.01);
(Continued)

(58) Field of Classification Search
CPC .......... G02B 5/208; G02B 5/26; B32B 7/023; B32B 2307/418; B32B 2309/105; F28F 13/18
(Continued)

(56) References Cited

U.S. PATENT DOCUMENTS

2006/0023327 A1  2/2006  Coombs et al.
2013/0071651 A1*  3/2013  Hakuta ................. C03C 17/34
                                                               428/333
(Continued)

FOREIGN PATENT DOCUMENTS

JP    S58-083168 A    5/1983
JP    H07-13018 A     1/1995
(Continued)

OTHER PUBLICATIONS

International Search Report issued in International Application No. PCT/JP2019/013285 dated Jun. 18, 2019.
(Continued)

*Primary Examiner* — Tahseen Khan
(74) *Attorney, Agent, or Firm* — Solaris Intellectual Property Group, PLLC

(57) ABSTRACT

Provided is a wavelength-selective absorptive material which includes, in the following order: a base material; a reflective layer; and a high refractive index layer having a refractive index n of 3.0 or more with respect to infrared light having a wavelength range of 8 μm to 13 μm, having a thickness d of 30 nm to 1,000 nm, and containing a binder and flat metal particles; and an infrared absorptive layer having a maximum absorption wavelength in a wavelength range of 8 μm to 13 μm, in which a product n×d of the refractive index n and the thickness d is more than 1,000 and less than 4,875.

11 Claims, 2 Drawing Sheets

(51) Int. Cl.
*F28F 13/18* (2006.01)
*B32B 7/023* (2019.01)
*G02B 5/26* (2006.01)

(52) U.S. Cl.
CPC ... *B32B 2307/418* (2013.01); *B32B 2309/105* (2013.01)

(58) Field of Classification Search
USPC .......................................................... 359/582
See application file for complete search history.

(56) References Cited

U.S. PATENT DOCUMENTS

| 2015/0338175 | A1 | 11/2015 | Raman et al. | |
|---|---|---|---|---|
| 2016/0082697 | A1* | 3/2016 | Hara | G02B 5/26 428/212 |
| 2016/0290036 | A1* | 10/2016 | Nukui | C08F 220/22 |
| 2016/0291207 | A1* | 10/2016 | Yasuda | G02B 5/008 |
| 2017/0363777 | A1 | 12/2017 | Maeda et al. | |
| 2018/0095209 | A1* | 4/2018 | Hakuta | E04B 1/86 |
| 2018/0239060 | A1* | 8/2018 | Hosoda | G02B 1/12 |
| 2018/0356572 | A1* | 12/2018 | Takishita | C08L 101/00 |
| 2020/0041703 | A1* | 2/2020 | Yasuda | G02B 5/08 |
| 2020/0217720 | A1* | 7/2020 | Yasuda | G01J 5/0809 |

FOREIGN PATENT DOCUMENTS

| JP | 2005-144985 A | 6/2005 |
|---|---|---|
| WO | 2011/152147 A1 | 12/2011 |
| WO | 2016/117436 A1 | 7/2016 |
| WO | 2017/068789 A1 | 4/2017 |
| WO | 2017/169506 A1 | 10/2017 |
| WO | 2018/180221 A1 | 10/2018 |
| WO | 2019/058833 A1 | 3/2019 |

OTHER PUBLICATIONS

Written Opinion of the ISA issued in International Application No. PCT/JP2019/013285 dated Jun. 18, 2019.
Raman, Aaswath P. et al., "Passive radiative cooling below ambient air temperature under direct sunlight," Nature, vol. 515, Macmillan Publishers Ltd., Nov. 27, 2014, pp. 540-544.
Office Action dated Jun. 16, 2020, issued by the JPO in corresponding Japanese Patent Application No. 2020-509223.

* cited by examiner

WAVELENGTH-SELECTIVE ABSORPTIVE MATERIAL, INFRARED SENSOR, WAVELENGTH-SELECTIVE LIGHT SOURCE, AND RADIATION COOLING SYSTEM

CROSS-REFERENCE TO RELATED APPLICATIONS

This application is a continuation application of International Application No. PCT/JP2019/013285, filed Mar. 27, 2019, the disclosure of which is incorporated herein by reference in its entirety. Further, this application claims priority from Japanese Patent Application No. 2018-065524, filed Mar. 29, 2018, the disclosure of which is incorporated herein by reference in its entirety.

BACKGROUND OF THE INVENTION

1. Field of the Invention

The present disclosure relates to a wavelength-selective absorptive material, an infrared sensor, a wavelength-selective light source, and a radiation cooling system.

2. Description of the Related Art

In recent years, wavelength-selective absorptive materials having wavelength-selective absorbency have been required in applications such as infrared sensors, wavelength-selective light sources, and radiation cooling systems.

For example, JP1983-083168A (JP-S58-083168A) discloses a radiation cooler including a heat-insulating container that thermally insulates an object to be cooled from the outside except for a part where the object to be cooled is introduced and a heat radiator that covers the exposed portion of the heat-insulating container. The heat radiator is formed of a conductive layer made of metal having a high reflectance and a high thermal conductivity in electric contact with the object to be cooled, and a selective radiation layer coated on the conductive layer and formed of a double layered inorganic material such as $CoCr_2O_7/K_2SO_4$, $Bi_3N_4/K_2SO_4$, and $K_2BO_4/K_2SO_4$, which have a high emissivity in a wavelength range where the light energy contained in the external light is low and which have a high transmittance in the other wavelength range, or a single layered organic material such as a vinyl fluoride-vinylidene fluoride copolymer, a polyoxypropylene, vinylidene difluoride, polypropylene, and a tetrafluoride copolymer. The radiation cooler absorbs the light energy of the external light in the specified wavelength range and radiates heat from the object to be cooled, and cools the object to be cooled, by reflecting the external light in the wavelength range other than the specified wavelength range.

In addition, "Aaswath P. Raman, Marc Abou Anoma, Linxiao Zhu, Eden Rephaeli, and Shanhui Fan, Passive radiative cooling below ambient air temperature under direct sunlight, Nature, 515, 540-544, 2014" describes a wavelength-selective absorptive film having a silicon substrate on which titanium, silver, $SiO_2$, and $HfO_2$ are laminated.

SUMMARY OF THE INVENTION

The inventors of the present invention have found that a radiation cooler disclosed in JP1983-083168A (JP-S58-083168A) and a wavelength-selective absorptive film described in "Aaswath P. Raman, Marc Abou Anoma, Linxiao Zhu, Eden Rephaeli, and Shanhui Fan, Passive radiative cooling below ambient air temperature under direct sunlight, Nature, 515, 540-544, 2014" particularly have high absorbance in the long wavelength range (wavelength range longer than 13 μm) and low wavelength selectivity.

An object to be achieved by embodiments of the present disclosure is to provide a wavelength-selective absorptive material exhibiting excellent wavelength-selective absorbency, an infrared sensor, a wavelength-selective light source, and a radiation cooling system, each of which includes the wavelength-selective absorptive material.

Means for achieving the object described above include the following embodiments.

<1> A wavelength-selective absorptive material comprising, in the following order:
a base material;
a reflective layer;
a high refractive index layer having a refractive index n of 3.0 or more with respect to infrared light having a wavelength range of 8 μm to 13 μm, having a thickness d of 30 nm to 1,000 nm, and containing a binder and flat metal particles; and
an infrared absorptive layer having a maximum absorption wavelength in the wavelength range of 8 μm to 13 μm,
in which a product n×d of the refractive index n and the thickness d is more than 1,000 and less than 4,875.

<2> The wavelength-selective absorptive material according to <1>, in which the infrared absorptive layer contains particles having a maximum absorption wavelength in a wavelength range of 8 μm to 13 μm.

<3> The wavelength-selective absorptive material according to <2>, in which the particle has a reststrahlen band, which results from phonon oscillation, in the wavelength range of 8 μm to 13 μm.

<4> The wavelength-selective absorptive material according to <2> or <3>, in which the particles include a $SiO_2$ particle, a SiC particle, or a SiN particle.

<5> The wavelength-selective absorptive material according to any one of <2> to <4>, in which a volume content proportion of the particles is 1% by volume to 50% by volume with respect to an entire infrared absorptive layer.

<6> The wavelength-selective absorptive material according to any one of <1> to <5>, in which a value obtained by dividing an average particle size of the flat metal particles by an average thickness thereof is 5 or more, principal planes of the flat metal particles are plane-oriented in a range of 0° to 30° with respect to a surface of the high refractive index layer, a volume fraction of the flat metal particles in the high refractive index layer is 30% by volume or more, and the flat metal particles are laminated in two or more layers.

<7> The wavelength-selective absorptive material according to any one of <1> to <6>, in which the flat metal particles contain at least silver.

<8> The wavelength-selective absorptive material according to any one of <1> to <7>, in which a shape of a principal plane of the flat metal particle is a polygonal shape of a hexagonal shape or a higher polygonal shape, or a circular shape.

<9> An infrared sensor comprising the wavelength-selective absorptive material according to any one of <1> to <8>.

<10> A wavelength-selective light source comprising the wavelength-selective absorptive material according to any one of <1> to <8>.

<11> A radiation cooling system comprising the wavelength-selective absorptive material according to any one of <1> to <8>.

According to the embodiments of the present disclosure, a wavelength-selective absorptive material that exhibits excellent wavelength-selective absorbency, an infrared sensor including the wavelength-selective absorptive material, a wavelength-selective light source, and a radiation cooling system can be provided.

DESCRIPTION OF THE PREFERRED EMBODIMENTS

Figure 1:
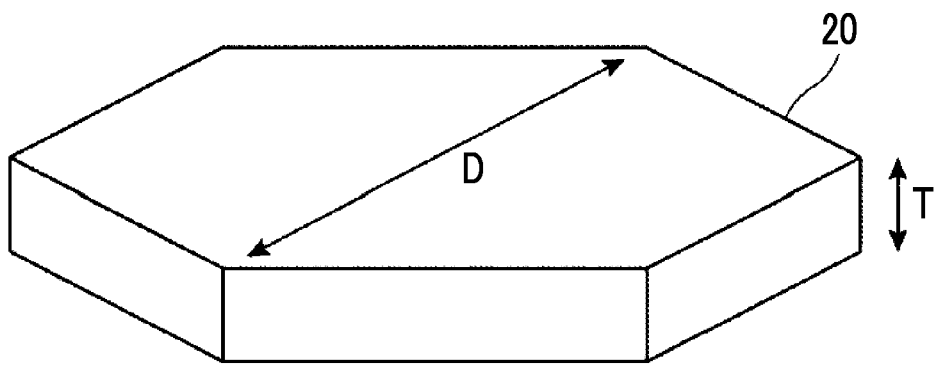
FIG. 1 is a schematic diagram illustrating an example of flat metal particles.

In the following description, the matters of the present disclosure will be described in detail. The explanation on the constitution requirements described below may be based on representative embodiments of the present disclosure; however, the present disclosure is not intended to be limited to those embodiments.

Although the description will be made with reference to the accompanying drawings, the references may be omitted.

In the present disclosure, the numerical range represented by using "to" means that the values described before and after "to" are included as the lower limit and the upper limit, respectively.

In the numerical range described stepwise in the present disclosure, the upper limit or lower limit described in one numerical range may be replaced with the upper limit or lower limit of the numerical range described stepwise in other ranges. In addition, in the numerical range described in the present disclosure, the upper limit or the lower limit of the numerical range may be replaced with the value shown in Examples.

In the present disclosure, the term "step" describes not only independent steps but is also used even in a case in which a step cannot be clearly distinguished from another step, as long as a predetermined purpose of the step is achieved.

In the present disclosure, the amount of individual components in the layer such as an infrared light absorptive layer means the total amount of the plurality of substances present in the layer, unless otherwise specified, in a case in which a plurality of substances corresponding to the individual components are present in the layer.

In the present disclosure, unless particularly stated otherwise, the molecular weight of a polymer component is the weight-average molecular weight (Mw) or the number average molecular weight (Mn) measured by gel permeation chromatography (GPC) in the case of using tetrahydrofuran (THF) as a solvent and calculated relative to polystyrene standards.

In the present disclosure, a combination of preferred embodiments is a more preferred embodiment.

(Wavelength-Selective Absorptive Material)

A wavelength-selective absorptive material according to the present disclosure includes, in the following order: a base material; a reflective layer; and a high refractive index layer having a refractive index n of 3.0 or more with respect to infrared light having a wavelength range of 8 µm to 13 µm, having a thickness d of 30 nm to 1,000 nm, and containing a binder and flat metal particles; and an infrared absorptive layer having a maximum absorption wavelength in a wavelength range of 8 µm to 13 µm, in which a product n×d of the refractive index n and the thickness d is more than 1,000 and less than 4,875.

As described above, in a wavelength-selective absorptive material obtained by laminating in total nine layers of a selective radiation layer formed of a double layered inorganic material such as $CoCr_2O_7/K_2SO_4$, $Bi_3N_4/K_2SO_4$, and $K_2BO_4/K_2SO_4$, which are known as wavelength-selective absorptive materials exhibiting typical wavelength-selective absorbency or a single layered organic material such as a vinyl fluoride-vinylidene fluoride copolymer, a polyoxypropylene, vinylidene difluoride, polypropylene, and a tetrafluoride copolymer, and layers each formed of titanium, silver, silica, and hafnium oxide on a silicon base material had a problem of low wavelength-selective absorbency.

As a result of diligent studies, the inventors of the present invention have found that a wavelength-selective absorptive material according to the present disclosure has excellent wavelength-selective absorbency.

In the present disclosure, "having excellent wavelength-selective absorbency" means that an average absorbance in a wavelength range of 8 µm to 13 µm is 70% or more, and an average absorbance in a wavelength range of 5 µm to 8 µm and a wavelength range of 13 µm to 25 µm is 40% or less.

The reason why the wavelength-selective absorptive material according to the present disclosure has excellent wavelength-selective absorbency is speculated as follows.

Since a high refractive index layer having a refractive index n of 3.0 or more with respect to infrared light having a wavelength range of 8 µm to 13 µm and an infrared absorptive layer having a maximum absorption wavelength at a wavelength range of 8 µm to 13 µm are provided, surface reflection due to the difference in refractive index is large at the interface between the high refractive index layer and the infrared absorptive layer opposite to the high refractive index layer from the reflective layer. It is speculated that Fabry-Perot resonance occurs between the reflected light produced by the reflection described above and the reflective layer positioned on one surface of the high refractive index layer. That is, it is speculated that the high refractive index layer itself serves as a Fabry-Perot resonator.

In a case in which the thickness d of the high refractive index layer is adjusted to 30 nm to 1,000 nm, and the product n×d of the refractive index n and the thickness d is adjusted to more than 1,000 and less than 4,875 nm, Fabry-Perot resonance occurs at a particular wavelength of the infrared light included in the wavelength range of 8 µm to 13 µm. Therefore, it is speculated that infrared light having the particular wavelength can be selectively absorbed in the wavelength range of 8 µm to 13 µm, and the wavelength-selective absorbency is excellent.

In addition, since the wavelength-selective absorptive material according to the present disclosure has the infrared absorptive layer, rectangularity of the absorption wavelength spectrum is easily increased, and a wavelength-selective absorptive material having excellent wavelength-selective absorbency is easily obtained.

Although the mechanism by which the rectangularity is increased by having the infrared absorptive layer is not clear, it is speculated to be due to the synergistic effect of the interference between layers and the interaction of near fields.

Further, in the wavelength-selective absorptive material according to the present disclosure, since the refractive index of the high refractive index layer is large such as 3.0 or higher, the resonator length of Fabry-Perot resonance can be shortened, and a wavelength-selective absorptive material having low angle dependency can be easily obtained.

Low angle dependency of a wavelength-selective absorptive material means that the change in the wavelength of the infrared light to be absorbed with respect to the change in the angle of infrared light incident to the wavelength-selective absorptive material is small.

Since the wavelength-selective absorptive material according to the present disclosure can constitute a wavelength-selective absorptive material exhibiting wavelength-selective absorbency with a very simple configuration of three layers of a reflective layer, a high refractive index layer, and an infrared absorptive layer, the wavelength-selective absorptive material exhibits excellent productivity.

<High Refractive Index Layer>

The wavelength-selective absorptive material according to the present disclosure includes a high refractive index layer having a refractive index of 3.0 or higher with respect to infrared light having a wavelength range of 8 μm to 13 μm and having a thickness of 30 nm to 1,000 nm.

[Refractive Index]

The refractive index of the high refractive index layer with respect to infrared light having a wavelength range of 8 μm to 13 μm is 3.0 or higher, preferably 5.0 or higher, and more preferably 7.0 or higher from the viewpoint of infrared light absorption ability.

The upper limit of the refractive index is not particularly limited, and the upper limit may be preferably 50 or less, and more preferably 30 or less.

Regarding the refractive index, the spectral reflectance and the spectral transmittance are measured using a Fourier transform infrared spectrophotometer (FTIR), and the refractive index is calculated based on the multiple reflection theory and the Fresnel interference theory. The refractive index can be determined as an arithmetic average value of the results obtained by performing measurement at a wavelength in the wavelength range of 8 μm to 13 μm in increments of 1 Furthermore, measurement is carried out at 25° C.

[Thickness]

The thickness (film thickness) of the high refractive index layer is 30 nm to 1,000 nm.

The wavelength-selective absorptive material according to the present disclosure forms a Fabry-Perot resonator in accordance with the thickness of the high refractive index layer and causes wavelength-selective absorption. Therefore, in order to absorb infrared light having a particular wavelength by the wavelength-selective absorptive material according to the present disclosure, it is necessary to set the thickness of the high refractive index layer according to the wavelength.

In a case in which it is intended to absorb infrared light having a wavelength λ it is preferable that the optical path length n×d, which is a product of the thickness d and the refractive index n of the high refractive index layer, is adjusted to a value that satisfies the following Expression 1, and it is more preferable that the optical path length is adjusted to a value that satisfies the following Expression 2.

$$\frac{1}{8}\lambda < n \times d < \frac{3}{8}\lambda \quad \text{[Expression 1]}$$

In Expression 1, λ represents a wavelength of infrared light that is intended to be absorbed and is a specific wavelength range of 8 μm to 13 μm. The units of λ and d are nm. The refractive index n is the refractive index of the high refractive index layer at a wavelength λ, the spectral reflectance and the spectral transmittance are measured using a Fourier transform infrared spectrophotometer (FTIR), and the refractive index n is calculated based on the multiple reflection theory and the Fresnel interference theory.

For example, when the refractive index n is 5.0 and the wavelength of infrared light that is intended to be absorbed is 10 μm (10,000 nm), the thickness d of the high refractive index layer is preferably 250 nm or more and 750 nm or less.

Since the wavelength-selective absorptive material according to the present disclosure needs to satisfy Expression 1 at any wavelength from 8 μm to 13 μm from the viewpoint of wavelength-selective absorbency, n×d is more than 1,000 (8,000 nm×⅛) and less than 4,875 (13,000×⅜).

$$\frac{3}{16}\lambda < n \times d < \frac{5}{16}\lambda \quad \text{[Expression 2]}$$

In Expression 2, λ, d, and n respectively have the same meanings as λ, d, and n in Expression 1, and preferred embodiments are respectively also the same.

The wavelength-selective absorptive material according to the present disclosure preferably satisfies Expression 2 at any wavelength range of 8 μm to 13 μm. That is, n×d is preferably more than 1,500 (8,000 nm×³⁄₁₆) and less than 4062.5 (13,000 nm×⁵⁄₁₆).

Further, from the viewpoint of improving the angle dependency, the thickness d is preferably thin. That is, by designing the refractive index n to be high and the thickness d to be thin, a wavelength-selective absorptive material having excellent angle dependency can be obtained.

The high refractive index layer according to the present disclosure is not particularly limited as long as the refractive index for infrared light having a wavelength range of 8 μm to 13 μm is 3.0 or higher; however, it is preferable that the value obtainable by dividing the average particle size of the flat metal particles by the average thickness is 5 or greater, the principal planes of the flat metal particles are plane-oriented in the range of 0° to 30° with respect to the surface of the high refractive index layer, the volume fraction of the flat metal particles in the high refractive index layer is 30% by volume or greater, and the flat metal particles are laminated in two or more layers. Hereinafter, the high refractive index layer according to the above-described embodiment is also referred to as "particular high refractive index layer".

Since a particular high refractive index layer can be formed by liquid phase film forming, it is speculated that in a case in which the wavelength-selective absorptive material according to the present disclosure includes a particular high refractive index layer, productivity is likely to be superior.

The particular high refractive index layer contains a binder and flat metal particles. In a case in which the particle size and thickness of the flat metal particles are sufficiently smaller than infrared light, regarding the refractive index of the layer, the particular high refractive index layer can be considered as being replaced with an effective homogeneous film according to an effective medium approximation.

The refractive index of the homogeneous film is considered to be dependent on the polarization of the flat metal particles contained in the particular high refractive index layer. That is, it is speculated that the refractive index of the homogeneous film can be increased by increasing the polarization of the flat metal particles.

Here, since a large number of free electrons are present in the flat metal particles used in the present structure, it is speculated that a large deviation is liable to occur in the distribution of free electrons by an incident electric field, and polarization becomes larger compared to the case of using non-metal particles.

In the present structure, the value obtainable by dividing the average particle size of the flat metal particles by the average thickness is 5 or greater, and the principal planes of the flat metal particles are plane-oriented in the range of 0° to 30° with respect to the surface of the particular high refractive index layer. It is speculated that as these flat particles are plane-oriented, the flat metal particles exhibit even larger polarization with respect to the incidence ray.

In addition, as the volume fraction of these flat metal particles in the high refractive index layer is 30% by volume or more, the refractive index can be further increased.

Since the flat metal particles are laminated in two or more layers, the optical path length within the film increases, and an interaction easily occurs between the incidence ray and the high refractive index layer. Therefore, it is speculated that a particular high refractive index layer having a high refractive index can be easily formed.

[Flat Metal Particles]

The high refractive index layer contains flat metal particles.

Shape

Flat metal particles are particles including two principal planes facing each other, and although the shape of the principal planes is not particularly limited, examples thereof include an octagonal shape, a hexagonal shape, a triangular shape, and a circular shape. Among these, from the viewpoint of increasing the transmittance for infrared light, it is preferable that the shape of the principal planes is a polygonal shape such as a hexagonal or higher polygonal shape, or a circular shape.

According to the present disclosure, a circular shape refers to a shape in which the number of sides each having a length of 50% or more of the average equivalent circle diameter of the flat metal particles that will be described below is zero per flat metal particle. The circular-shaped flat metal particle is not particularly limited as long as it has a round shape without corners in a case in which the flat metal particle is observed from the upper side of the principal plane using a transmission electron microscope (TEM).

In the present specification, a hexagonal shape refers to a shape in which the number of sides each having a length of 20% or more of the average equivalent circle diameter of the flat metal particles that will be described below is six per flat metal particle. The shape of other polygons is similarly defined by the number of sides having a length of 20% or more of the average equivalent circle diameter of the flat metal particles per flat metal particle. The hexagonal-shaped flat metal particle is not particularly limited as long as the flat metal particle has a hexagonal shape in a case in which the flat metal particle is observed from the upper side of the principal plane with a transmission electron microscope (TEM), and can be selected as appropriate according to the purpose. For example, the corners of the hexagonal shape may be of acute angles or of obtuse angles; however, from the viewpoint that absorption in the visible light region can be reduced, it is preferable that the hexagonal shape has at least one obtuse angle, and it is more preferable that all of the six corners are of obtuse angles. The angle of the obtuse angle is not particularly limited and can be selected as appropriate according to the purpose.

With regard to the corners of the hexagonal shape, the corners may be blunt. A corner being blunt means a state in which a corner is not formed by two straight lines, but the apex of the corner has a roundish shape. The degree of the bluntness of the corner is not particularly limited and can be selected as appropriate according to the purpose.

Average Particle Size (Average Equivalent Circle Diameter)

Figure 2:
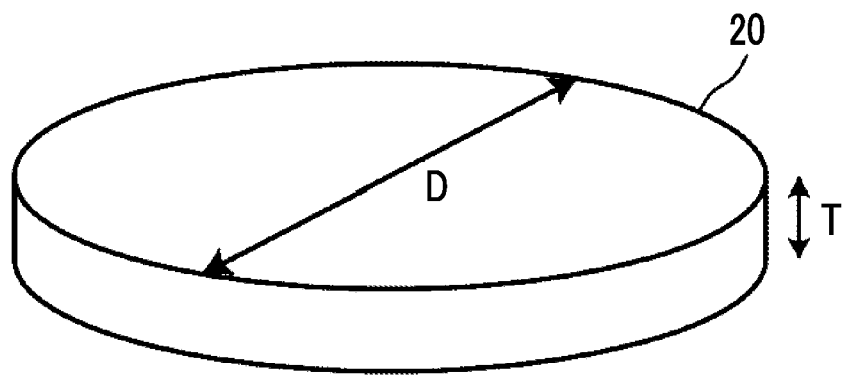
FIG. 2 is a schematic diagram illustrating another example of flat metal particles.

The equivalent circle diameter is represented by the diameter of a circle having the same area as the projected area of an individual particle. The projected area of an individual particle can be obtained by a known method of measuring the area in an electron micrograph and compensating the area by the magnification ratio of imaging. For example, as shown in FIGS. 1 and 2, the equivalent circle diameter D of flat metal particles 20 is obtained from the projected area in a case in which the flat metal particles are observed from above the principal plane. The average particle size (average equivalent circle diameter) is obtained by obtaining the particle diameter distribution (particle size distribution) of the equivalent circle diameter D of two hundred flat metal particles and calculating the arithmetic average thereof.

The average particle size is not particularly limited; however, the average particle size is preferably 50 nm to 2,000 nm, more preferably 70 nm to 1,500 nm, and still more preferably 100 nm to 1,000 nm.

Average Thickness and Aspect Ratio

The average thickness of the flat metal particles is preferably 50 nm or less, more preferably 2 nm to 25 nm, and particularly preferably 4 nm to 15 nm.

The particle thickness T corresponds to the distance between the principal planes of a flat metal particle, and for example, the particle thickness T is as shown in FIG. 1 and FIG. 2. The particle thickness T can be measured by a transmission electron microscope (TEM).

Regarding the method of measuring the average particle thickness by TEM, a method of subjecting a film containing flat metal particles to a coating treatment based on carbon vapor deposition or metal vapor deposition, producing a cross-section slice by focused ion beam (FIB) processing, and performing the measurement of the particle thickness by observing the cross-section by TEM, and the like may be mentioned. The average thickness of the flat metal particles is obtained by calculating the arithmetic average of the thicknesses of two hundred flat metal particles.

The value D/T (also referred to as "aspect ratio") obtained by dividing the average particle size D of the flat metal particles by the average thickness T is preferably 5 or more. A preferred range of the aspect ratio is not particularly limited as long as the value is 5 or larger, and the value can be selected as appropriate according to the purpose. However, from the viewpoint of the trade-off between high refractive index and the scattering loss of the incidence ray, the value is preferably 5 to 100, and more preferably 5 to 60.

In a case in which the aspect ratio is 5 or larger, it is possible to obtain a high refractive index, and in a case in which the aspect ratio is 100 or less, the scattering loss of the incidence ray can also be suppressed.

The ratio of the maximum length and the minimum length in a principal plane at the time of observing a particle from the upper direction is not particularly limited and can be selected as appropriate according to the purpose; however, from the viewpoint of suppressing anisotropy of the refractive index, the ratio is preferably 10 or less.

Planar Orientation

Within the particular high refractive index layer, the principal planes of the flat metal particles are plane-oriented in the range of 0° to 30° with respect to the surface of the particular high refractive index layer.

This will be described below using FIG. 3.

Figure 3:
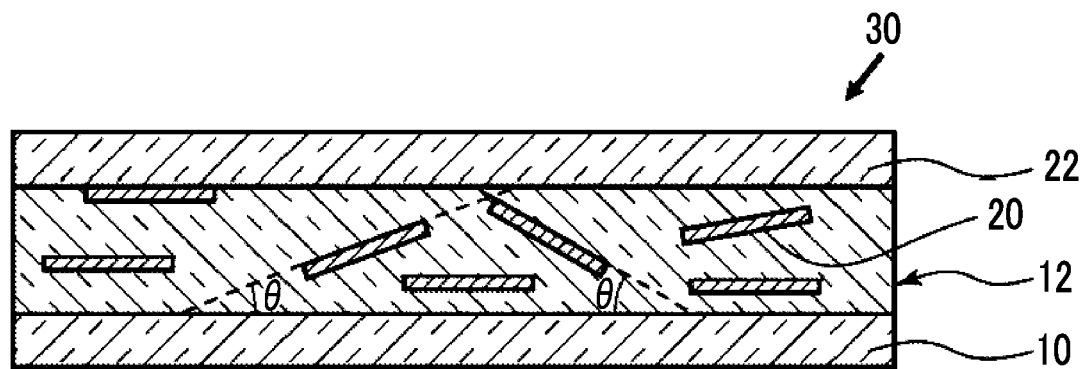
FIG. 3 is a schematic cross-sectional view illustrating an example of a high refractive index layer 12 containing flat metal particles 20.

FIG. 3 is a schematic cross-sectional view illustrating an example of the high refractive index layer 12 including flat metal particles 20, in the particular high refractive index layer according to the present disclosure. The wavelength-selective absorptive material 30 in FIG. 3 has a high refractive index layer 12 and a reflective layer 10. In addition, an infrared absorptive layer 22 is formed on the surface of the high refractive index layer 12 opposite to the surface having the reflective layer 10. In the following description, the angle θ formed by the reflective layer 10 and a principal plane (a face that determines the equivalent circle diameter D) of a flat metal particle 20 will be described using FIG. 3.

In FIG. 3, the angle (absolute value of angle θ) formed by the surface of the high refractive index layer 12 (interface with the reflective layer 10) and a principal plane (a face that determines the equivalent circle diameter D) of the flat metal particle 20 or an extension line of the principal plane is 0° to 30°. Meanwhile, the angle θ refers to the angle of the smaller side between the angles formed by the surface of the high refractive index layer 12 and a principal plane (a face that determines the equivalent circle diameter D) of the flat metal particle 20 or an extension line of the principal plane.

According to the present disclosure, the description that the principal planes of the flat metal particles are plane-oriented in the range of 0° to 30° with respect to the surface of the high refractive index layer, implies that the arithmetic average value of the absolute value of the θ measured for random one hundred particles is 0° to 30°. Meanwhile, the above-mentioned arithmetic average value is also referred to as "degree of planar orientation".

The absolute value of the θ is measured by a method of producing a cross-section slice of the high refractive index layer and evaluating by observing the high refractive index layer and the flat metal particles in this slice.

Specifically, a method of producing a cross-section slice sample of the high refractive index layer using a focused ion beam (FIB), and evaluating an image obtained by observing this sample using a transmission electron microscope (TEM), may be mentioned.

Regarding the method for observing a cross-section slice sample produced as described above, there are no particular limitations as long as it can be checked thereby whether the principal planes of the flat metal particles are plane-oriented with respect to the surface of the high refractive index layer in the sample; however, for example, a method of using TEM or the like may be mentioned.

The principal planes of the flat metal particles are plane-oriented in the range of 0° to 30° with respect to the surface of the high refractive index layer, and it is preferable that the principal planes are plane-oriented in the range of 0° to 20°, and more preferably plane-oriented in the range of 0° to 10°. It is more preferable that at the time of observing a cross-section of the high refractive index layer, the flat metal particles 20 are oriented in a state in which the angle (±θ) shown in FIG. 3 is small. In a case in which θ is 30° or less, the magnitude of polarization occurring within the flat metal particles becomes large, and a high refractive index (for example, the refractive index for a wavelength range of 8 μm to 13 μm is 5.0 or higher, or the like) is easily obtained.

Materials

The material for the flat metal particles is not particularly limited and can be selected as appropriate according to the purpose; however, from the viewpoint of having low absorbance for infrared light, silver, gold, aluminum, copper, rhodium, nickel, platinum, titanium, alloys thereof, and the like are preferred, and among them, it is more preferable to include at least silver.

Content Proportion of Flat Metal Particles

According to the present disclosure, one kind of flat metal particles may be used alone, or two or more kinds thereof may be used in combination.

From the viewpoint of increasing the refractive index, the volume fraction of the flat metal particles in the high refractive index layer is preferably 30% by volume or more, more preferably 35% by volume or more, and still more preferably 40% by volume or more.

Regarding the volume fraction of the flat metal particles in the high refractive index layer, for example, a method of producing an appropriate cross-section slice and evaluating by observing the abundance of the flat metal particles in this slice can be employed. The method of observing a cross-section slice is similar to the method of observing a cross-section slice in the case of measuring the absolute value of θ in the planar orientation described above.

State of Lamination of Flat Metal Particles

The flat metal particles are laminated in two or more layers within the particular high refractive index layer, and it is preferable that the flat metal particles are laminated in three or more layers. The upper limit is not particularly limited; however, the upper limit is preferably 50 layers or fewer.

Here, lamination in two or more layers can be checked by producing a cross-section slice and observing the state of lamination of the flat metal particles in this slice. Specifically, in a case in which a cross-section slice sample of the particular high refractive index layer is produced using a focused ion beam (FIB) or the like, and this is observed using various microscopes (for example, TEM or the like), at the time of drawing one hundred lines at an interval of the average particle size in a direction perpendicular to the film plane, in a case in which 75 or more lines cross two or more flat metal particles, it is defined that the flat metal particles are laminated in two or more layers.

Similarly, in a case in which 75 or more lines cross three or more flat metal particles, it is defined that the flat metal particles are laminated in three or more layers. Hereinafter, the same also applies to four or more layers.

State of Arrangement of Flat Metal Particles

The flat metal particles are randomly arranged in the surface direction of the high refractive index layer.

The flat metal particles being randomly arranged in the surface direction of the high refractive index layer implies that the particle coordinates in a direction parallel to the surface of the high refractive index layer are random. Here, being random implies that in the power spectrum of the spatial frequency obtainable by subjecting the particle coordinates in a direction parallel to the high refractive index layer to Fourier transformation, no meaningful maximum point other than the point of origin occurs. Here, the peak of the spatial frequency 1/R (wherein R represents the average particle size) occurring as a result of expulsion between particles is not regarded as a maximum point.

Specifically, in a case in which a cross-section sample or a cross-section slice sample of the high refractive index layer is produced using a focused ion beam (FIB) or the like, and this is observed using various microscopes (a transmission electron microscope (TEM) and the like), the central coordinates in the surface direction of the high refractive index layer and in a direction parallel to the above-mentioned direction are determined for one hundred flat metal particles, and the randomness can be evaluated from the power spectrum of the spatial frequency obtained by subjecting these coordinates to Fourier transformation.

Plasmon Resonance

It is preferable that the flat metal particles exhibit localized surface plasmon resonance, it is more preferable that the flat metal particles have a plasmon resonance wavelength in the wavelength range of 0.5 µm to 5 µm, and it is still more preferable that the particles have a plasmon resonance wavelength in the wavelength range of 0.8 µm to 5 µm.

Since the flat metal particles exhibit localized surface plasmon resonance, for example, absorption of visible light (light having a wavelength range of 400 nm or more and less than 780 nm) occurs, and thus it is also possible to lower the transmittance for visible light.

The plasmon resonance wavelength of the flat metal particles can be adjusted by means of the material for the flat metal particles and the refractive index of the binder that will be described below.

The plasmon resonance wavelength is measured by calculating the spectral reflectance using a Fourier transform infrared spectrophotometer (FTIR) or a spectrophotometer and calculating the maximum point of the spectral reflectance. In the case of having a plasmon resonance wavelength at 0.8 µm to 2.5 µm, it is preferable to use a spectrophotometer, and in the case of having a plasmon resonance wavelength at 2.5 µm to 5.0 µm, it is preferable to use a Fourier transform infrared spectrophotometer.

Method for Synthesizing Flat Metal Particles

The method for synthesizing the flat metal particles is not particularly limited and can be appropriately selected according to the purpose, and for example, liquid phase methods such as a chemical reduction method, a photochemical reduction method, and an electrochemical reduction method may be mentioned as methods capable of synthesizing flat metal particles (particularly, flat metal particles having a polygonal shape such as a hexagonal shape or higher polygonal shape, or a circular shape). Among these, from the viewpoint of the controllability of shape and size, liquid phase methods such as a chemical reduction method and a photochemical reduction method are particularly preferred. After hexagonal-to triangular-shaped flat metal particles are synthesized, hexagonal-shaped or circular-shaped flat metal particles may be obtained by carrying out, for example, an etching treatment using a dissolving species that dissolves silver, such as nitric acid or sodium sulfite, or an aging treatment by heating, or the like, whereby the corners of the hexagonal- to triangular-shaped flat metal particles can be blunted.

Regarding the method for synthesizing the flat metal particles, in addition to that, seed crystals may be fixed in advance to the surface of the reflective layer that will be described below, and then crystals of metal particles (for example, Ag) may be grown into a flat shape.

In the high refractive index layer according to the present disclosure, the flat metal particles may be subjected to a further treatment in order to impart desired characteristics to the particles. Examples of the further treatment include the formation of a high refractive index shell layer and the addition of various additives such as a dispersant and an antioxidant.

[Binder]

The high refractive index layer according to the present disclosure contains a binder.

The binder is not particularly limited; however, it is preferable that the binder is a material that can retain flat metal particles in a dispersed state. From the viewpoint of productivity, it is preferable that the binder is a material that can form a film in a liquid phase.

It is preferable that the binder in the metal particle-containing layer includes a polymer, a rubber, or an inorganic substance formed by a sol-gel method, and it is preferable that the binder includes a polymer.

Preferred examples of the polymer include, for example, polymers such as a polyolefin resin, a cyclic polyolefin resin, a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, and a natural polymer such as gelatin and cellulose.

Among them, from the viewpoint of transparency to infrared light, it is preferable that the main polymer is a polyolefin resin or a cyclic polyolefin resin.

Regarding the polymer, any polymer that is commercially available can be preferably used, and examples include Arrowbase (registered trade mark), which is a modified polyolefin resin manufactured by Unitika Ltd.; CHEMIPEARL (registered trade mark), which is an aqueous dispersion of a polyolefin manufactured by Mitsui Chemicals, Inc.; HARDLEN (registered trade mark), which is a modified polyolefin resin manufactured by Toyobo Co., Ltd.; and HIGH-TECH (registered trade mark) manufactured by Toho Chemical Industry Co., Ltd.

In the present disclosure, the term "main polymer" means a polymer component that occupies 50% by mass or more of the polymers contained in the high refractive index layer.

Regarding the rubber, known ones can be used; however, from the viewpoint of transmissibility to infrared light, it is preferable to use nitrile rubber, ethylene-propylene rubber, butyl rubber, or the like.

Regarding the inorganic substance formed by a sol-gel method, known ones can be used. Examples of such a material include oxides such as silica and titanium oxide; and fluorides such as magnesium fluoride.

It is preferable that the binder according to the present disclosure is transparent to infrared light. According to the present disclosure, being "transparent to infrared light" means that the transmittance for infrared light at any wavelength in the range of 8 µm to 13 µm is 20% or higher, preferably 30% or higher, and more preferably 50% or higher. The upper limit of the transmittance is not particularly limited, and the transmittance may be 100% or lower. The transmittance is measured by using the spectral reflectance using a Fourier transform infrared spectrophotometer (FTIR) or a spectrophotometer.

Refractive Index

The refractive index of the binder used for the present disclosure is preferably 1.3 or higher, more preferably 1.4 or higher, and still more preferably 1.5 or higher. In a case in which the refractive index of the binder is in the above-described range, the refractive index of the high refractive index layer can be further increased.

The refractive index of the binder is determined by measuring the spectral reflectance and the spectral transmittance using a Fourier transform infrared spectrophotometer (FTIR) and calculating the refractive index based on the multiple reflection theory and the Fresnel interference theory.

Content Proportion

It is preferable that the high refractive index layer according to the present disclosure contains the binder in an amount of 10% by volume to 70% by volume, more preferably in an amount of 15% by volume to 70% by volume, and still more preferably in an amount of 25% by volume to 60% by volume.

The content proportion of the binder is calculated by a method similar to that for the content proportion of the flat metal particles.

[Other Components]

The high refractive index layer according to the present disclosure may contain other components in addition to the flat metal particles and the binder. Examples of the other components include air and known additives.

<Infrared Absorptive Layer>

The wavelength-selective absorptive material according to the present disclosure has an infrared absorptive layer.

The infrared absorptive layer according to the present disclosure is a layer having a maximum absorption wavelength at least in a wavelength range of 8 µm to 13 µm.

The absorbance at the maximum absorption wavelength is preferably 50% to 100% and more preferably 70% to 100%.

The maximum absorption wavelength and the absorbance in the infrared absorptive layer can be determined by measuring the spectral reflectance and the spectral transmittance using a Fourier transform infrared spectrophotometer (FTIR) and performing the measurement at a wavelength in the wavelength range of 8 µm to 13 µm in increments of 0.1 The absorbance is obtained as an arithmetic average value of the results from measuring random 5 points in the infrared absorptive layer.

It is preferable that the infrared absorptive layer is in contact with the high refractive index layer.

Further, in the infrared absorptive layer, the average absorbance at a wavelength range of 5 µm to 8 µm and a wavelength range of 13 µm to 25 µm is preferably 40% or less. The lower limit of the average absorbance is not particularly limited, and the average absorbance may be 0% or more.

[Thickness]

The thickness (film thickness) of the infrared absorptive layer is not particularly limited, but is preferably 1 µm to 20 µm and more preferably 1 µm to 10 µm.

In a case in which the thickness is 1 µm or more, sufficient absorption of infrared light can be obtained.

In a case in which the thickness is 20 µm or less, the transmittance of infrared light other than the infrared light having a specific wavelength is high, and a wavelength-selective absorptive material having excellent wavelength-selective absorbency is easily obtained.

<Particles>

The infrared absorptive layer preferably contains particles having a maximum absorption wavelength in a wavelength range of 8 µm to 13 µm.

The particles preferably have reststrahlen band, which results from phonon oscillation, in the wavelength range of 8 µm to 13 µm.

The reststrahlen band is a wavelength range between Longitudinal Optical (LO) phonons and Transverse Optical (TO) phonons, and it is known that reflection occurs in a case of a bulk material and absorption occurs in a case of a particle material, in this wavelength range.

[Material of Particles]

Further, the particles are preferably inorganic particles. Among the inorganic particles, particles made of materials such as carbides, nitrides, and oxides are preferable from the viewpoint of particle stability.

Further, in the present disclosure, the particles preferably include silicon carbide (SiC) particles, silicon nitride (SiN) particles, silicon oxide ($SiO_2$) particles, or boron nitride (BN) particles, and more preferably include $SiO_2$ particles, SiC particles, or SiN particles.

Here, SiC exhibits a reststrahlen band in a range of 10 µm to 13 µm, silicon nitride exhibits a reststrahlen band in a range of 10 µm to 13 µm, silicon oxide exhibits a reststrahlen band in a range of 8 µm to 10 µm, and BN exhibits a reststrahlen band in a range of 8 µm to 10 µm.

[Particle Shape and Particle Size]

The shape of the particles is not particularly limited and may be spherical, elliptical, flat, or acicular depending on the application.

The volume average particle diameter of the particles is 50 nm to 2,000 nm and more preferably 100 nm to 1,000 nm.

In a case in which the volume average particle diameter is 50 nm or more, the influence of surface defects, adsorption of molecules on the surface, and the like are suppressed, and thus the wavelength-selective absorbency tends to be excellent. In addition, in a case in which the volume average particle diameter is 2,000 nm or less, the scattering of light of 8 µm to 13 µm due to particles is small, and thus the wavelength-selective absorbency tends to be excellent.

The volume average particle diameter is measured by a laser scattering method using a laser scattering diffraction particle size distribution measuring device.

[Volume Content Proportion of Particles]

The volume content proportion of the particles is preferably 1% by volume to 50% by volume and more preferably 3% by volume to 20% by volume, with respect to the entire infrared absorptive layer.

In a case in which the volume content proportion is 1% or more, the absorbance with respect to light having a wavelength range of 8 µm to 13 µm tends to be high. Further, in a case in which the volume content proportion is 50% or less, the reflection of light having a wavelength range of 8 µm to 13 µm hardly occurs, and the wavelength-selective absorbency tends to be improved.

In the present disclosure, the volume content proportion is calculated by producing a cross section in a direction perpendicular to the surface of the infrared absorptive layer by a focused ion beam (FIB) processing or the like and observing the cross section with a TEM.

[Binder]

It is preferable that the infrared absorptive layer according to the present disclosure contains a binder.

As the binder, the same binder as the binder in the high refractive index layer described above can be used, and a preferred embodiment is also the same.

From the viewpoint of heat resistance and the like, it is preferable that the binder contained in the infrared absorptive layer and the binder contained in the high refractive index layer are a combination having a close expansion property with respect to temperature change.

Further, from the viewpoint of resistance to bending, a combination having a similar Young's modulus is preferred.

[Other Components]

The infrared absorptive layer in the present disclosure may contain other components, in addition to the particles and the binder, in order to impart desired properties. Examples of other components include known additives such as air, a dispersant, and an antioxidant.

<Reflective Layer>

The wavelength-selective absorptive material according to the present disclosure has a reflective layer.

In the present disclosure, the reflective layer is a layer that reflects at least infrared light having a wavelength range of 8 μm to 13 μm, and the reflectance for infrared light having a wavelength range of 8 μm to 13 μm is preferably 50% to 100%.

The reflectance in the reflective layer can be determined by measuring the spectral reflectance and the spectral transmittance using a Fourier transform infrared spectrophotometer (FTIR) and calculating the arithmetic average value of the results obtained by performing the measurement at a wavelength in the wavelength range of 8 μm to 13 μm in increment of 1 μm.

It is preferable that the reflective layer is in contact with the high refractive index layer.

The reflective layer is preferably a Bragg mirror layer or a metal layer and more preferably a metal layer.

Regarding the Bragg mirror layer, a Bragg mirror in which dielectric layers are laminated, and specifically, for example, a known Bragg mirror obtained by alternately laminating a low refractive index layer and a high refractive index layer, or the like is used.

Examples of the metal layer include layers containing metal materials such as aluminum, silver, gold, copper, platinum, chromium, nickel, tungsten, and titanium, and it is preferable that the metal layer contains aluminum, silver, gold, or copper.

The film thickness of the reflective layer is preferably 3 nm or more in order to cause reflection at the interface with the high refractive index layer, and it is particularly preferable to have a film thickness of 10 nm or more. The upper limit of the film thickness is not particularly limited, and for example, the upper limit may be 1 mm or less.

The method for producing the reflective layer is not particularly limited and can be selected from among production methods of known liquid phase methods and gas phase methods. Above all, it is preferable to produce the reflective layer by a gas phase method that can cause strong reflection at the interface with the high refractive index layer with high quality. Examples of the production method according to such a gas phase method include a vapor deposition method and a sputtering method.

<Base Material>

Further, the wavelength-selective absorptive material according to the present disclosure has a base material on the reflective layer opposite to the high refractive index layer.

The wavelength-selective absorptive material according to the present disclosure may further have a base material on the infrared absorptive layer opposite to the high refractive index layer.

The base material is not particularly limited; however, it is preferable to use a base material having a high transmittance with respect to infrared light.

Regarding the base material having high transmittance to infrared light, for example, a base material having a transmittance for infrared light having any one wavelength in the range of 8 μm to 13 μm of 50% or higher may be mentioned.

Examples of the base material having high transmittance to infrared light include, as inorganic materials, silicon, germanium, chalcogenide glass, quartz glass, sapphire, calcium fluoride, barium fluoride, magnesium fluoride, zinc selenide, zinc sulfide, and diamond.

Particularly, it is preferable to use silicon, germanium, chalcogenide glass, quartz glass, or the like, all of which have high transmittance for infrared light and excellent environmental durability.

Examples of the base material having high transmittance to infrared light include, as organic materials, films formed from polyolefin-based resins such as a polyolefin-based resin, a cyclic polyolefin-based resin, poly(4-methylpentene-1), and polybutene-1; polyester-based resins such as polyethylene terephthalate and polyethylene naphthalate; a polycarbonate-based resin, a polyvinyl chloride-based resin, a polyphenylene sulfide-based resin, a polyether sulfone-based resin, a polyethylene sulfide-based resin, a polyphenylene ether-based resin, a styrene-based resin, an acrylic resin, a polyamide-based resin, a polyimide-based resin, and cellulose-based resins such as cellulose acetate, or laminate films of these. Among these, a polyolefin-based resin film and a cyclic polyolefin-based resin film are suitable. Specific, commercially available films can also be preferably used, and for example, ARTON manufactured by JSR Corporation, ZEONEX manufactured by Zeon Corporation, and TOPAS manufactured by Polyplastics Co., Ltd. may be mentioned as specific examples.

<Other Layers>

The wavelength-selective absorptive material according to the present disclosure may have other layers.

Examples of the other layers include a pressure sensitive adhesive layer, a hard coat layer, and a back coat layer, as described in paragraph 0075 to paragraph 0080 of JP2015-129909A. Furthermore, examples of the other layers include an ultraviolet absorptive layer and an antifouling layer.

<Method for Producing Wavelength-Selective Absorptive Material>

The wavelength-selective absorptive material according to the present disclosure can be produced by, for example, forming a reflective layer by a gas phase method on a base material and forming a high refractive index layer (preferably, particular high refractive index layer) and an infrared absorptive layer, on the reflective layer by a liquid phase method.

According to an embodiment, for example, a method including a step of forming a reflective layer on a base material (reflective layer forming step), a step of applying a coating liquid for forming a high refractive index layer on the reflective layer (high refractive index layer coating step), and a step of applying a coating liquid for forming an infrared absorptive layer (infrared absorptive layer coating step), may be mentioned.

In addition, as necessary, a step of drying the applied coating liquid for forming a high refractive index layer (high refractive index layer drying step) and a step of drying the applied coating liquid for forming an infrared absorptive layer (infrared absorptive layer drying step) may be further included.

[Reflective Layer Forming Step]

In the reflective layer forming step, it is preferable that a reflective layer is formed on a base material.

The method for forming a reflective layer is not particularly limited and is carried out by the above-mentioned liquid phase method or gas phase method, and examples include a vapor deposition method and a sputtering method.

[High Refractive Index Layer Coating Step]

The coating method in the coating step is not particularly limited, and any known method can be used.

Examples of the coating method include methods of applying by means of a spin coater, a dip coater, a die coater, a slit coater, a bar coater, a gravure coater, and the like; and methods of inducing planar orientation by methods such as a Langmuir-Blodgett (LB) film method, a self-assembly method, and spray coating.

Coating Liquid for Forming High Refractive Index Layer

The coating liquid for forming a high refractive index layer preferably contains the flat metal particles and the binder and may further contain known solvents, known additives, and the like.

It is preferable that the flat metal particles are dispersed in the coating liquid.

The coating liquid for forming a high refractive index layer may contain a raw material of the binder. Examples of the raw material of the binder include a polymerizable compound and a polymerization initiator, and particularly by containing a polymerizable compound and a photopolymerization initiator, a high refractive index layer can be formed pattern-wise by exposure to light.

In a case in which the coating liquid for forming a high refractive index layer contains the above-described raw material of the binder, it is preferable that the method for producing the high refractive index layer according to the present disclosure further includes a step of forming a binder.

In the step of forming a binder, for example, a method of curing at least a portion of the applied coating liquid for forming a high refractive index layer by means of any known method such as exposure to light or heating is employed.

[Infrared Absorptive Layer Coating Step]

The coating method in the coating step is not particularly limited, and any known method can be used.

Examples of the coating method include methods of applying by means of a spin coater, a dip coater, a die coater, a slit coater, a bar coater, a gravure coater, and the like; and methods of inducing planar orientation by methods such as a Langmuir-Blodgett (LB) film method, a self-assembly method, and spray coating.

Coating Liquid for Forming Infrared Absorptive Layer

The coating liquid for forming an infrared absorptive layer preferably contains the particles and the binder and may further contain known solvents, known additives, and the like.

It is preferable that the particles are dispersed in the coating liquid.

The coating liquid for forming an infrared absorptive layer may contain a raw material of the binder. Examples of the raw material of the binder include a polymerizable compound and a polymerization initiator, and particularly by containing a polymerizable compound and a photopolymerization initiator, an infrared absorptive layer can be formed pattern-wise by exposure to light.

In a case in which the coating liquid for forming an infrared absorptive layer contains the above-described raw material of the binder, it is preferable that the method for producing the infrared absorptive layer according to the present disclosure further includes a step of forming a binder.

In the step of forming a binder, for example, a method of curing at least a portion of the applied coating liquid for forming an infrared absorptive layer by means of any known method such as exposure to light or heating is employed.

[High Refractive Index Layer Drying Step and Infrared Absorptive Layer Drying Step]

Regarding the high refractive index layer drying step and the infrared absorptive layer drying step, any known drying method is used without particular limitations. For example, heated drying at normal pressure or under reduced pressure, and natural drying may be used. The heating method for the heated drying is not particularly limited, and for example, a method of heating using an apparatus such as a hot plate or an oven may be used.

The high refractive index layer drying step and the infrared absorptive layer drying step may be carried out as separate steps after coating each layer or carried out by single drying after completion of coating both the high refractive index layer and the infrared absorptive layer.

(Infrared Sensor)

It is preferable that the infrared sensor according to the present disclosure includes the wavelength-selective absorptive material according to the present disclosure.

Regarding the infrared sensor, for example, a sensor including a solid-state imaging element and the wavelength-selective absorptive material according to the present disclosure may be mentioned.

Examples of solid-state imaging elements include an infrared photodiode, a bolometer, and a thermopile.

(Wavelength-Selective Light Source)

The wavelength-selective light source according to the present disclosure includes the wavelength-selective absorptive material according to the present disclosure.

Under Kirchhoff's Law related to radiation energy, the absorbance and the emissivity of an object become equal. That is, the wavelength-selective absorptive material according to the present disclosure can be used as a wavelength-selective infrared-radiating material for a wavelength range of 8 μm to 13 μm.

Therefore, the wavelength-selective absorptive material according to the present disclosure can also be used as a wavelength-selective infrared-radiating material and is suitably used as a radiating material for a wavelength-selective light source.

For example, with regard to the wavelength-selective absorptive material according to the present disclosure, in a case in which the wavelength-selective absorptive material is used as a wavelength-selective light source, radiating the wavelength matching the absorption peak of the object to be heated is realized.

(Radiation Cooling System)

The radiation cooling system according to the present disclosure includes the wavelength-selective absorptive material according to the present disclosure.

According to the radiation cooling system, an object to be cooled, which is accommodated in the inside, is cooled by utilizing a radiation cooling phenomenon. That is, the radiation cooling apparatus according to the present disclosure has an internal space that accommodates the object to be cooled. For example, the wavelength-selective absorptive material according to the present disclosure constitutes a portion of partition walls for defining the internal space and is disposed on the air side when viewed from the internal space.

Regarding the radiation cooling system, more specifically, for example, the radiation cooling system described in A. P. Raman, et al., "Passive radiative cooling below ambient air temperature under direct sunlight", Nature, Vol. 515, 540, 2014, may be mentioned.

The wavelength-selective absorptive material according to the present disclosure absorbs infrared light in the wavelength range of 8 μm to 13 μm included in the wavelengths called the window of the atmosphere, and has high wavelength-selective absorbency, and thus is suitably used for a radiation cooling system.

EXAMPLES

Hereinafter, the present disclosure will be described in detail according to Examples. The materials, amounts of use, proportions, treatment content, treatment procedure, and the like disclosed in the following Examples can be modified as appropriate as long as the purpose of the embodiments of the present disclosure is maintained. Therefore, the scope of the embodiments of the present disclosure is not limited to the specific examples described below. Meanwhile, in the present Examples, the units "parts" and "percent (%)" mean "parts by mass" and "percent (%) by mass", unless particularly stated otherwise.

<Evaluation of Wavelength-Selective Absorptive Material>

[Production of High Refractive Index Layer]

Preparation of Flat Metal Particle Dispersion Liquid A1

In a reaction vessel made of NTKR-4 (manufactured by Nippon Metal Industry Co., Ltd.), 13 L of ion-exchanged water was weighed, and while the ion-exchanged water was stirred using a chamber equipped with an agitator having four sheets of propellers made of NTKR-4 and four sheets of paddles made of NTKR-4 attached to a shaft made of SUS316L, 1.0 L of a 10 g/L aqueous solution of trisodium citrate (anhydride) was added thereto. The mixture was kept warm at 35° C. 0.68 L of a 8.0 g/L aqueous solution of polystyrene sulfonate was added thereto, and 0.041 L of an aqueous solution of sodium borohydride prepared at 23 g/L using a 0.04 mol/L aqueous solution of sodium hydroxide was further added thereto. 13 L of a 0.10 g/L aqueous solution of silver nitrate was added thereto at a rate of 5.0 L/min.

1.0 L of a 10 g/L aqueous solution of trisodium citrate (anhydride) and 11 L of ion-exchanged water were added thereto, and 0.68 L of a 80 g/L aqueous solution of potassium hydroquinone sulfate was further added thereto. Stirring was raised to 800 revolutions per minute (rpm), 8.1 L of a 0.10 g/L aqueous solution of silver nitrate was added thereto at a rate of 0.95 L/min, and then the temperature was decreased to 30° C.

8.0 L of a 44 g/L aqueous solution of methylhydroquinone was added thereto, and then the entire amount of an aqueous gelatin solution at 40° C. that will be described below was added thereto. The stirring speed was raised to 1,200 rpm, and the entire amount of a mixed liquid of a white precipitate of silver sulfite that will be described below was added thereto.

At the time when the pH change of the prepared liquid stopped, 5.0 L of a 1 mol/L aqueous solution of NaOH was added at a rate of 0.33 L/min. Subsequently, 0.078 L of 70 g/L 1,2-benzisothiazolin-3-one (dissolved by regulating the aqueous solution to become alkaline with NaOH) was added thereto. In this manner, a flat metal particle dispersion liquid A1 was prepared.

Preparation of Aqueous Gelatin Solution 16.7 L of ion-exchanged water was weighed in a dissolution tank made of SUS316L. While low-speed stirring was carried out with an agitator made of SUS316L, 1.4 kg of alkali-treated bovine bone gelatin that had been subjected to a deionization treatment (GPC weight-average molecular weight 200,000) was added thereto. Furthermore, 0.91 kg of alkali-treated bovine bone gelatin (GPC weight-average molecular weight 21,000) that had been subjected to a deionization treatment, a proteolytic enzyme treatment, and an oxidation treatment using hydrogen peroxide was added thereto. Subsequently, the temperature was increased to 40° C., and swelling and dissolution of gelatin were carried out simultaneously to completely dissolve gelatin.

Preparation of Mixed Liquid of White Precipitate of Silver Sulfite 8.2 L of ion-exchanged water was weighed in a dissolution tank made of SUS316L, and 8.2 L of a 100 g/L aqueous solution of silver nitrate was added thereto. While high-speed stirring was carried out with an agitator made of SUS316L, 2.7 L of a 140 g/L aqueous solution of sodium sulfite was added in a short period of time, and thereby a mixed liquid including a white precipitate of silver sulfite was prepared. This mixed liquid was prepared immediately before use.

Preparation of Flat Metal Particle Dispersion Liquid B1

800 g of the flat metal particle dispersion liquid A1 was collected in a centrifuge tube, and the dispersion liquid was adjusted to a pH in the range of 9.2±0.2 at 25° C. using a 1 mol/L aqueous solution of sodium hydroxide. A centrifugation operation was carried out using a centrifuge (himac CR22GIII manufactured by Hitachi Koki Co., Ltd., angle rotor R9A) by setting at 35° C. for 60 minutes at 9,000 rpm, and then 784 g of a supernatant was discarded. A 0.2 mmol/L aqueous solution of NaOH was added to flat plate particles that had precipitated to make up a total amount of 400 g, the mixture was manually stirred using a stirring rod, and a crude dispersion liquid was obtained. A crude dispersion liquid having a volume equivalent to 24 centrifuge tubes was prepared by an operation similar to the above-described operation to make up a total amount of 9,600 g, and the crude dispersion liquid was added to a tank made of SUS316L and mixed. Furthermore, 10 ml of a 10 g/L solution (diluted with a mixed liquid of methanol:ion-exchanged water=1:1 (volume ratio)) of Pluronic 31R1 (manufactured by BASF SE) was added thereto. The crude dispersion liquid mixture in the tank was subjected to batch type dispersing treatment for 120 minutes at 9,000 rpm using AUTO MIXER Model 20 manufactured by Primix Corporation (stirring unit was HOMOMIXER-MARKII). The liquid temperature during dispersing was maintained at 50° C. 800 g of the dispersion liquid thus obtained was collected again into a centrifuge tube, and a centrifugation operation was carried out using a centrifuge (himac CR22GIII manufactured by Hitachi Koki Co., Ltd., angle rotor R9A) by setting at 35° C. for 60 minutes at 9,000 rpm, and then 760 g of the supernatant was discarded. A 0.2 mmol/L aqueous solution of sodium hydroxide was added to flat plate particles that had precipitated to make up a total amount of 800 g, the mixture was manually stirred using a stirring rod, and a crude dispersion liquid was obtained. A crude dispersion liquid having a volume equivalent to 12 centrifuge tubes was prepared by an operation similar to the above-described operation to make up a total amount of 9,600 g, and the crude dispersion liquid was added to a tank made of SUS316L and mixed. Furthermore, 10 mL of a 10 g/L solution (diluted with a mixed liquid of methanol:ion-exchanged water=1:1 (volume ratio)) of Pluronic 31R1 (manufactured by BASF SE) was added thereto. The crude dispersion liquid mixture in the tank was subjected to batch type dispersing treatment for 120 minutes at 9,000 rpm using AUTO MIXER Model 20 manufactured by Primix Corporation (stirring unit was HOMOMIXER-MARKII). The liquid temperature during dispersing was maintained at 50° C. After dispersing, the temperature was lowered to 25° C., and then single-pass filtration was performed using a PROFILE II filter (manufactured by Pall Corporation, product type MCY1001Y030H13).

In this manner, the flat metal particle dispersion liquid A1 was subjected to a desalting treatment and a redispersing treatment, and thus a flat metal particle dispersion liquid B1 was prepared. The flat metal particles in the obtained flat metal particle dispersion liquid B1 includes silver.

Preparation of Flat Metal Particle Dispersion Liquids A2 and B2

The preparation of flat metal particle dispersion liquids A2 and B2 was carried out in the same manner as the preparation of the flat metal particle dispersion liquids A1 and B1, except that the reaction conditions were changed so that the average thickness, the average particle size, the aspect ratio, and the shape had the values described in the following Table.

TABLE 1

|  | Average thickness | Average particle size | Aspect ratio | Shape |
|---|---|---|---|---|
| A1(B1) | 8 nm | 120 nm | 15 | Hexagonal plate |
| A2(B2) | 10 nm | 300 nm | 30 | Hexagonal plate |

<Preparation of Coating Liquid C1 for Forming High Refractive Index Layer>

A coating liquid C1 for forming a high refractive index layer was prepared at the compositional ratio of the materials indicated in Table 2. The values in the table are indicated in terms of parts by mass.

Here, 2.78 L of an aqueous solution of 0.1% by mass of chloroauric acid (manufactured by FUJIFILM Wako Pure Chemical Corporation) was added to 50 L of the coating liquid C1, the mixture was stirred for 4 hours at 60° C., and this was designated as a coating liquid for forming a high refractive index layer C1.

TABLE 2

|  | Coating liquid C1 |
|---|---|
| Aqueous solution of polyurethane: Hydran HW-350 (30% by mass of solid content concentration, manufactured by DIC Corporation | 0.9 |
| Surfactant A: F Ripar 8780P (1% by mass of solid content concentration, manufactured by Lion Corporation | 2.4 |
| Surfactant B: Aronacty CL-95 (1% by mass of solid content concentration, manufactured by Sanyo Chemical Industries, Ltd.) | 2.4 |
| Surfactant C: sodium = 1,2-[bis(3,3,4,4,5,5,6,6,6-nanofluorohexylcarbonyl)]ethane sulfonate (2% by mass of solid content concentration) | 1.0 |
| Flat metal particle dispersion liquid B1 | 84.7 |
| Water | 8.6 |

<Preparation of Coating Liquid C2 for Forming High Refractive Index Layer>

Preparation of the coating liquid C2 for forming a high refractive index layer was performed in the same manner as the preparation of the coating liquid C1 for forming a high refractive index layer, except that the flat metal particle dispersion liquid B2 was used instead of the flat metal particle dispersion liquid B1.

<Preparation of Coating Liquid D1 for Forming Infrared Absorptive Layer>

The coating liquid D1 for forming an infrared absorptive layer was prepared by mixing 1.5 parts by mass of silicon carbide particles (α-SiC2500N) manufactured by TOMOE Engineering Co., Ltd. and 20 parts by mass of Arrowbase (SD-1200) which is a modified polyolefin resin manufactured by Unitika Ltd. The silicon carbide particles have a particle size of 600 nm and a spherical shape.

<Preparation of Coating Liquid D2 for Forming Infrared Absorptive Layer>

The coating liquid D2 for forming an infrared absorptive layer was prepared by mixing 1.5 parts by mass of silicon dioxide particles (NP-SIO2-1K) manufactured by EM Japan Co., LTD. and 20 parts by mass of Arrowbase (SD-1200) which is a modified polyolefin resin manufactured by Unitika Ltd. The silicon dioxide particles have a particle size of 400 nm and a spherical shape.

<Preparation of Coating Liquid D3 for Forming Infrared Absorptive Layer>

The coating liquid D3 for forming an infrared absorptive layer was prepared by mixing 1.5 parts by mass of silicon nitride particles (NP-SI3N4-2-100) manufactured by EM Japan Co., LTD. and 20 parts by mass of Arrowbase (SD-1200) which is a modified polyolefin resin manufactured by Unitika Ltd. The silicon nitride particles have a particle size of 800 nm and a spherical shape.

<Preparation of Coating Liquid D4 for Forming Infrared Absorptive Layer>

The coating liquid D4 for forming an infrared absorptive layer was prepared by mixing 1.5 parts by mass of titanium oxide particles (NP-TIO2-13) manufactured by EM Japan Co., LTD. and 20 parts by mass of Arrowbase (SD-1200) which is a modified polyolefin resin manufactured by Unitika Ltd. The titanium oxide particles have a particle size of 300 nm and a spherical shape.

<Production of Wavelength-Selective Absorptive Material E1>

On a 3-inch silicon wafer having a thickness of 0.28 mm, silver having a thickness of 200 nm was vapor deposited using an electron beam vapor deposition apparatus, EBX-8C, manufactured by Ulvac Techno, Ltd. Next, on the silver film (reflective layer) thus vapor deposited, spin coating of the coating liquid for forming a high refractive index layer C1 was carried out at a speed of rotation of 500 rpm using a spin coater manufactured by Mikasa Co., Ltd. Subsequently, the resultant was heated, dried, and solidified on a hot plate at 110° C. for one minute. The above-described procedure was repeated until the film thickness reached 450 nm.

Thereafter, spin coating of the coating liquid for forming an infrared absorptive layer D1 was carried out at a speed of rotation of 1,000 rpm using a spin coater manufactured by Mikasa Co., Ltd. Subsequently, the resultant was heated, dried, and solidified on a hot plate at 110° C. for one minute.

<Production of Wavelength-Selective Absorptive Materials E2 to E4 and Comparative Wavelength-Selective Absorptive Materials E1 to E5>

Wavelength-selective absorptive materials E2 to E4 and comparative wavelength-selective absorptive materials E1 to E5 were produced in the same manner as the producing method for the wavelength-selective absorptive material E1, except that the kind of coating liquid for forming a high refractive index layer, the kind of coating liquid for forming an infrared absorptive layer, and the film thickness of the high refractive index layer were changed as described in Table 3 below.

An infrared absorptive layer was not formed in the comparative wavelength-selective absorptive material E4, and a high refractive index layer was not formed in the comparative wavelength-selective absorptive material E5.

TABLE 3

| | | High refractive index layer | | | | Infrared absorptive layer | | | | |
|---|---|---|---|---|---|---|---|---|---|---|
| Wavelength-selective absorptive material | Reflective layer | Coating liquid | Film thickness | Refracctive index | n × d | Coating liquid | Film thickness | Volume content proportion of particles | Maximum absorption wavelength | Particle type |
| E1 | Silver | C1 | 450 nm | 4.8 | 2160 | D1 | 2500 nm | 11% | 11 μm | SiC |
| E2 | Silver | C2 | 240 nm | 9.5 | 2280 | D1 | 2500 nm | 11% | 11 μm | SiC |
| E3 | Silver | C2 | 270 nm | 9.5 | 2565 | D2 | 2500 nm | 12% | 9 μm | SiO$_2$ |
| E4 | Silver | C2 | 240 nm | 9.5 | 2280 | D3 | 2500 nm | 10% | 11 μm | SiN |
| E1 for comparison | Silver | C2 | 100 nm | 9.5 | 950 | D1 | 2500 nm | 11% | 11 μm | SiC |
| E2 for comparison | Silver | C2 | 600 nm | 9.5 | 5700 | D1 | 2500 nm | 11% | 11 μm | SiC |
| E3 for comparison | Silver | C2 | 240 nm | 9.5 | 2280 | D4 | 2500 nm | 8% | 16 μm | TiO$_2$ |
| E4 for comparison | Silver | C2 | 240 nm | 9.5 | 2280 | — | — | — | — | — |
| E5 for comparison | Silver | — | — | — | — | D1 | 2500 nm | 11% | 11 μm | SiC |

Regarding the wavelength-selective absorptive materials E1 to E4 and the comparative wavelength-selective absorptive materials E1 to E5, the particle inclination angle (degree of planar orientation) of the flat metal particles was 0° to 5°, and the number of layers of laminated flat metal particles was 2 layers or more, and the volume fraction of the flat metal particles was 30% or more.

<Evaluation of Wavelength-Selective Absorption Characteristics>

In each of Examples or Comparative Examples, a Fourier transform infrared spectrophotometer VIR-100 manufactured by JASCO Corporation was used and an integrating sphere unit was used to measure an infrared diffuse reflectance R (%) and an infrared diffuse transmittance T (%) of the wavelength-selective absorptive materials E1 to E4 or the comparative wavelength-selective absorptive materials E1 to E5, with respect to the light incident from the front. The measurement was performed in an environment of room temperature (23° C.) and relative humidity of 60%, and the sampling interval was 10 nm. From the infrared diffuse reflectance and the infrared diffuse transmittance thus obtained, infrared absorbance A was calculated according to the following expression.

$$A=100-T-R$$

Figure 4:
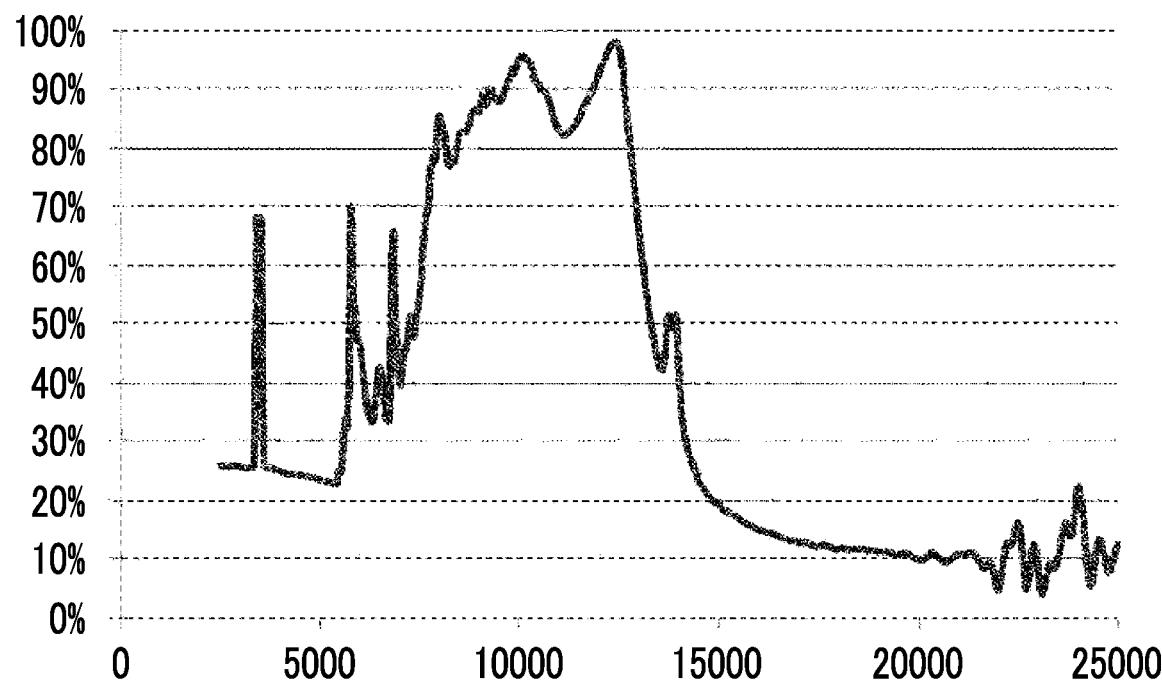
FIG. 4 is a graph showing an absorption spectrum of a wavelength-selective absorptive material E2 in Examples.

FIG. 4 is an infrared absorption spectrum of the wavelength-selective absorptive material E2, in which the vertical axis represents the infrared absorbance A and the horizontal axis represents the wavelength (nm).

The obtained infrared absorbance was weighted with the blackbody radiation intensity at room temperature (23° C.), and the average value at the wavelength range of 8 μm to wavelength 13 μm was indicated as the absorbance ($A_{8-13}$) at the wavelength range of 8 μm to wavelength 13 μm. The average value at the wavelength range of 5 μm to 8 μm and the wavelength range of 13 μm to 25 μm was indicated as the absorbance ($A_{5-8,\ 13-25}$) at other than the wavelength range of 8 μm to 13 μm.

In a case in which $A_{8-13}$ was 70% or more and $A_{5-8,\ 13-25}$ was 40% or less, the wavelength-selective absorbency was evaluated to be good (evaluation A), and in a case in which $A_{8-13}$ was less than 70% or/and $A_{5-8,\ 13-25}$ was more than 40%, wavelength-selective absorbency was evaluated to be poor (evaluation B). The evaluation results are shown in Table 4.

<Evaluation of Angle Dependency>

A Fourier transform infrared spectrophotometer VIR-100 manufactured by JASCO Corporation was used and an integrating sphere unit was used to measure an infrared diffuse reflectance R (%) and an infrared diffuse transmittance T (%) of the wavelength-selective absorptive materials in Examples E1 to E5, with respect to each of the light incident from the front and the light incident at 45°. The measurement was performed in an environment of room temperature (23° C.) and relative humidity of 60%, and the sampling interval was 10 nm. From the infrared diffuse reflectance and the infrared diffuse transmittance thus obtained, infrared absorbance A was calculated according to the following expression.

$$A=100-T-R$$

Regarding the infrared absorbance with respect to the light incident from the front and the light incident at 45°, the angle dependency was evaluated to be low (evaluation A) in a case in which the difference in the maximum absorption wavelength was 500 nm or less, and the angle dependency was evaluated to be high (evaluation B) in a case in which the difference in the absorption peak wavelength was more than 500 nm. The evaluation results are described in Table 4.

<Evaluation of Rectangularity>

The value obtained by the following expression was defined as the rectangularity, and the wavelength-selective absorptive materials E1 to E4 and the comparative wavelength-selective absorptive materials E1 to E5 were evaluated.

$$\text{Rectangularity}=(A_{8-13})/(A_{5-8,\ 13-25})$$

As $A_{8-13}$ and $A_{5-8,\ 13-25}$, the values obtained in "Evaluation of wavelength-selective absorption characteristics" described above were used.

The higher the rectangularity is, the more rectangular the spectrum is. The evaluation results are described in Table 4.

TABLE 4

| | Wavelength-selective absorptive material | $A_{8-13}$ | $A_{5-8, 13-25}$ | Rectangularity | Evaluation Wavelength-selective absorbency | Angle dependency |
|---|---|---|---|---|---|---|
| Example 1 | E1 | 90% | 35% | 2.57 | A | A |
| Example 2 | E2 | 87% | 22% | 3.95 | A | A |
| Example 3 | E3 | 92% | 32% | 2.88 | A | A |
| Example 4 | E4 | 85% | 30% | 2.83 | A | A |
| Comparative Example 1 | E1 for comparison | 62% | 40% | 1.55 | B | A |
| Comparative Example 2 | E2 for comparison | 58% | 44% | 1.32 | B | B |
| Comparative Example 3 | E3 for comparison | 55% | 46% | 1.20 | B | A |
| Comparative Example 4 | E4 for comparison | 45% | 26% | 1.73 | B | A |
| Comparative Example 5 | E5 for comparison | 51% | 28% | 1.82 | B | A |

It has been confirmed that good wavelength-selective absorbency is obtained in all of the wavelength-selective absorptive materials E1 to E4 as compared with the comparative wavelength-selective absorptive materials E1 to E5.

It was also has been confirmed that all of the wavelength-selective absorptive materials E1 to E4 have good angle dependency.

Further, it has been confirmed that all of the wavelength-selective absorptive materials E1 to E4 had good rectangularity.

As described above, as shown in Examples, according to the present disclosure, it has been confirmed that a wavelength-selective absorptive material having excellent wavelength-selective absorbency is obtained.

The disclosure of JP2018-065524 filed on Mar. 29, 2018, is incorporated herein in its entirety by reference. All publications, patent applications, and technical standards mentioned in this specification are herein incorporated by reference to the same extent as in the case in which each publication, patent application, or technical standard is specifically and individually indicated to be incorporated herein.

What is claimed is:

1. A wavelength-selective absorptive material comprising, in the following order:
   a base material;
   a reflective layer;
   a high refractive index layer having a refractive index n of 3.0 or more with respect to infrared light having a wavelength range of 8 µm to 13 µm, having a thickness d of 30 nm to 1,000 nm, and containing a binder and flat metal particles A; and
   an infrared absorptive layer having a maximum absorption wavelength in the wavelength range of 8 µm to 13 µm,
   wherein a product n×d of the refractive index n and the thickness d is more than 1,000 and less than 4,875.

2. The wavelength-selective absorptive material according to claim 1, wherein the infrared absorptive layer contains particles B having a maximum absorption wavelength in the wavelength range of 8 µm to 13 µm.

3. The wavelength-selective absorptive material according to claim 2, wherein the particles B have a reststrahlen band, which results from phonon oscillation, in the wavelength range of 8 µm to 13 µm.

4. The wavelength-selective absorptive material according to claim 2, wherein the particles B include a $SiO_2$ particle, a SiC particle, or a SiN particle.

5. The wavelength-selective absorptive material according to claim 2, wherein a volume content proportion of the particles B is 1% by volume to 50% by volume with respect to an entire infrared absorptive layer.

6. The wavelength-selective absorptive material according to claim 1, wherein a value obtained by dividing an average particle size of the flat metal particles A by an average thickness thereof is 5 or more, principal planes of the flat metal particles A are plane-oriented in a range of 0° to 30° with respect to a surface of the high refractive index layer, a volume fraction of the flat metal particles A in the high refractive index layer is 30% by volume or more, and the flat metal particles A are laminated in two or more layers.

7. The wavelength-selective absorptive material according to claim 1, wherein the flat metal particles A contain at least silver.

8. The wavelength-selective absorptive material according to claim 1, wherein a shape of a principal plane of each flat metal particle A is a polygonal shape of a hexagonal shape or a higher polygonal shape, or a circular shape.

9. An infrared sensor comprising:
   the wavelength-selective absorptive material according to claim 1.

10. A wavelength-selective light source comprising:
    the wavelength-selective absorptive material according to claim 1.

11. A radiation cooling system comprising:
    the wavelength-selective absorptive material according to claim 1.

* * * * *